(12) United States Patent
Suezawa

(10) Patent No.: US 12,143,545 B2
(45) Date of Patent: Nov. 12, 2024

(54) APPARATUS AND COMPUTER READABLE MEDIUM FOR EXECUTING PROCESS RELATED TO ELECTRONIC DOCUMENT

(71) Applicant: FUJIFILM Business Innovation Corp., Tokyo (JP)

(72) Inventor: Yoshihito Suezawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 487 days.

(21) Appl. No.: 17/380,047

(22) Filed: Jul. 20, 2021

(65) Prior Publication Data

US 2022/0286566 A1 Sep. 8, 2022

(30) Foreign Application Priority Data

Mar. 2, 2021 (JP) .................................. 2021-032796

(51) Int. Cl.
| | | |
|---|---|---|
| *G06F 16/174* | (2019.01) | |
| *G06F 16/34* | (2019.01) | |
| *G06F 16/38* | (2019.01) | |
| *G06F 40/169* | (2020.01) | |
| *H04N 1/00* | (2006.01) | |

(52) U.S. Cl.
CPC ....... *H04N 1/0049* (2013.01); *H04N 1/00244* (2013.01)

(58) Field of Classification Search
CPC ............. H04N 1/0049; H04N 1/00244; H04N 1/00437; H04N 1/00477; H04N 1/00482; G06F 16/16; G06F 16/11; G06F 16/122
See application file for complete search history.

(56) References Cited

U.S. PATENT DOCUMENTS

| | | | |
|---|---|---|---|
| 2011/0199629 A1 | 8/2011 | Sensu et al. | |
| 2015/0264206 A1* | 9/2015 | Maeda | H04N 1/00509 358/1.13 |
| 2015/0350467 A1 | 12/2015 | Kodimer | |
| 2019/0387112 A1* | 12/2019 | Sensu | G06F 3/04847 |
| 2020/0117405 A1* | 4/2020 | Sunami | G06F 13/00 |
| 2021/0006685 A1* | 1/2021 | Fukuda | G06F 3/1238 |

FOREIGN PATENT DOCUMENTS

| | | |
|---|---|---|
| EP | 2938056 | 10/2015 |
| JP | 2016115242 | 6/2016 |

OTHER PUBLICATIONS

"Search Report of Europe Counterpart Application", issued on Feb. 21, 2022, pp. 1-9.

* cited by examiner

*Primary Examiner* — Iriana Cruz
(74) *Attorney, Agent, or Firm* — JCIPRNET

(57) ABSTRACT

An information processing apparatus includes a processor configured to, in a case where a utilizer performs a process related to an electronic document, perform highlighted display of an operator for executing an expected process on a display screen based on process content information indicating a content of the expected process expected to be executed on the electronic document.

7 Claims, 13 Drawing Sheets

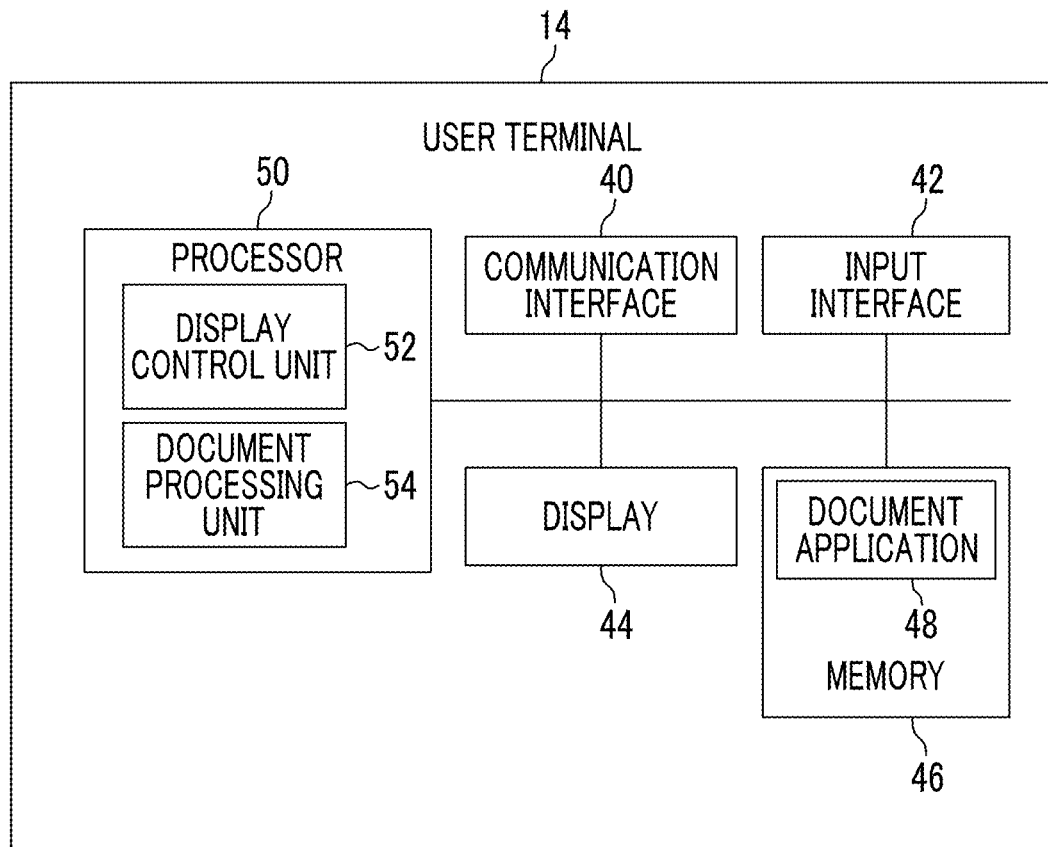

APPARATUS AND COMPUTER READABLE MEDIUM FOR EXECUTING PROCESS RELATED TO ELECTRONIC DOCUMENT

CROSS-REFERENCE TO RELATED APPLICATIONS

This application is based on and claims priority under 35 USC 119 from Japanese Patent Application No. 2021-032796 filed Mar. 2, 2021.

BACKGROUND

(i) Technical Field

The present invention relates to an information processing apparatus and a non-transitory computer readable medium storing an information processing program.

(ii) Related Art

JP2016-115242A discloses a document management system that includes a server managing an electronic document, and a terminal apparatus used by a utilizer. The document management system notifies the utilizer of a priority degree of the electronic document based on a priority degree of a folder of the server storing the electronic document.

SUMMARY

The utilizer can not only use the electronic document managed in the document management system but also perform a plurality of types of processes related to the electronic document using a utilizer apparatus such as a personal computer or a tablet terminal. In order for the utilizer to easily perform the plurality of types of processes related to the electronic document, a plurality of operators corresponding to the plurality of types of processes, respectively, can be displayed on a display screen of the utilizer apparatus. The utilizer can perform an intended process related to the electronic document by selecting and operating an operator corresponding to the intended process from the plurality of operators displayed on the display screen.

Here, in a case where the plurality of operators for executing the processes related to the electronic document are present, a problem arises in that the utilizer has to specify an operator necessary for the process from the plurality of operators displayed on the display screen, and that this work is cumbersome. Particularly, even in a case where an expected process that is a process expected to be executed on the electronic document is fixed, the utilizer has to specify an operator corresponding to the expected process from the plurality of operators displayed on the display screen.

Aspects of non-limiting embodiments of the present disclosure relate to an information processing apparatus and a non-transitory computer readable medium storing an information processing program that enable a utilizer to easily specify an operator corresponding to an expected process for an electronic document, compared to a case where the operator for executing the expected process related to the electronic document and an operator for executing a process other than the expected process related to the electronic document are displayed on a display screen in the same aspect.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in a case where a utilizer performs a process related to an electronic document, perform highlighted display of an operator for executing an expected process on a display screen based on process content information indicating a content of the expected process expected to be executed on the electronic document.

BRIEF DESCRIPTION OF THE DRAWINGS

Exemplary embodiment(s) of the present invention will be described in detail based on the following figures, wherein:

FIG. 4 is a schematic configuration diagram of a user terminal;

FIG. 5 is a diagram illustrating a content of notification information;

DETAILED DESCRIPTION

Figure 1:
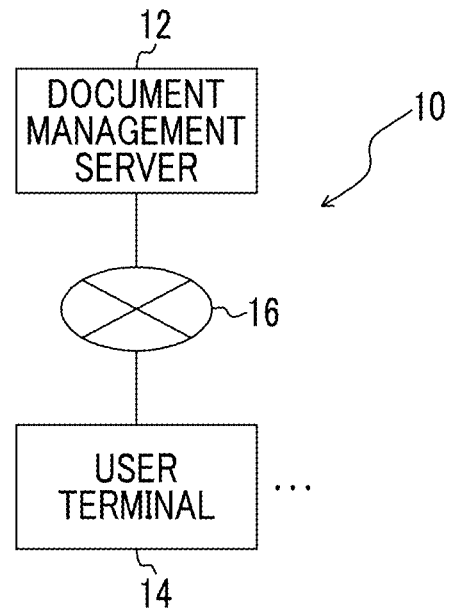
FIG. 1 is a schematic configuration diagram of an information processing system according to an exemplary embodiment.

FIG. 1 is a schematic configuration diagram of an information processing system 10 according to the exemplary embodiment. The information processing system 10 is configured to include a document management server and a user terminal 14 as an information processing apparatus used by a user as a utilizer. The document management server 12 and the user terminal 14 are communicably connected to each other through a communication line 16 including, for example, an Internet line or a local area network (LAN). As will be described in detail later, the information processing system 10 is a document management system in which the document management server 12 manages an electronic document transmitted from the user terminal 14, and in which the document management server 12 transmits the electronic document to the user terminal 14 in response to a request from the user terminal 14. While only one user terminal 14 is illustrated in FIG. 1, a plurality of user terminals 14 used by a plurality of users may be included in the information processing system 10.

Figure 2:
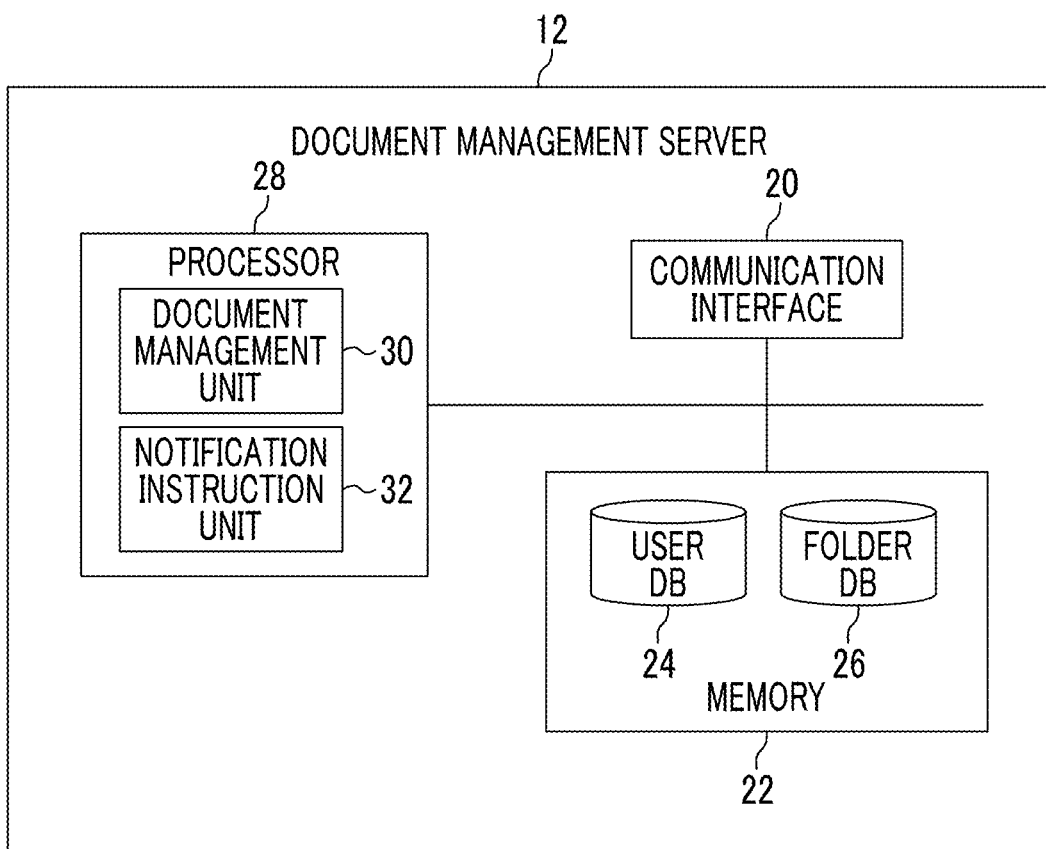
FIG. 2 is a schematic configuration diagram of a document management server.

FIG. 2 is a schematic configuration diagram of the document management server 12. The document management server 12 is configured with, for example, a server computer. The document management server 12 is a server that provides a document management service for managing the electronic document. Specifically, the document management server 12 authenticates a user who is registered in advance, by an authentication process and provides the document management service to the authenticated user. The document management server 12 may be configured with a plurality of computers. That is, the electronic document management service may be provided to the user by cooperation among a plurality of server computers.

The communication interface 20 is configured to include, for example, a network adapter. The communication interface 20 performs a function of communicating with the user terminal 14 through the communication line 16.

The memory 22 is configured to include, for example, a hard disk drive (HDD), a solid state drive (SSD), an embedded multi media card (eMMC), a read only memory (ROM), or a random access memory (RAM). The memory 22 stores a server program for functioning of each unit of the document management server 12. In addition, the memory 22 stores a plurality of electronic documents transmitted from the user terminal 14, that is, managed by the document management service. Each electronic document stored in the memory 22 is assigned a document ID for uniquely identifying the electronic document, and the document ID and the electronic document are managed in association with each other. A storage aspect of the electronic document in the memory 22 will be described later.

As illustrated in FIG. 2, the memory 22 stores a user database (DB) 24 and a folder DB 26. The user DB 24 stores user information in which a user ID for uniquely identifying the user, a user name of the user, and a notification destination (for example, information for uniquely identifying the user terminal 14 used by the user) of the user acquired by a user registration process at a start of use of the document management service by the user are associated with each other. The folder DB 26 stores folder information in which a folder ID (or a uniform resource locator (URL)) for uniquely identifying a folder (described in detail later) for storing an electronic document, which is defined in the memory 22, information indicating a type (described later) of the folder, and the user ID of the user corresponding to the folder are associated with each other.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The processor 28 performs functions as a document management unit 30 and a notification instruction unit 32 in accordance with the server program stored in the memory 22.

The document management unit 30 executes a process of managing the electronic document. Specifically, the electronic document transmitted from the user terminal 14 is stored in the memory 22, and the electronic document stored in the memory 22 is transmitted to the user terminal 14 in response to a request from the user terminal 14. In addition, the document management unit 30 executes a process such as assigning the document ID to the electronic document stored in the memory 22.

The notification instruction unit 32 executes a process of transmitting a notification to the user who uses the document management service, in a case where a predetermined condition is satisfied. In the exemplary embodiment, the notification to the user (that is, the user terminal 14) is executed by the process of the notification instruction unit 32. However, the notification process may be executed by a notification service such as Firebase Cloud Messaging (FCM).

Figure 3:
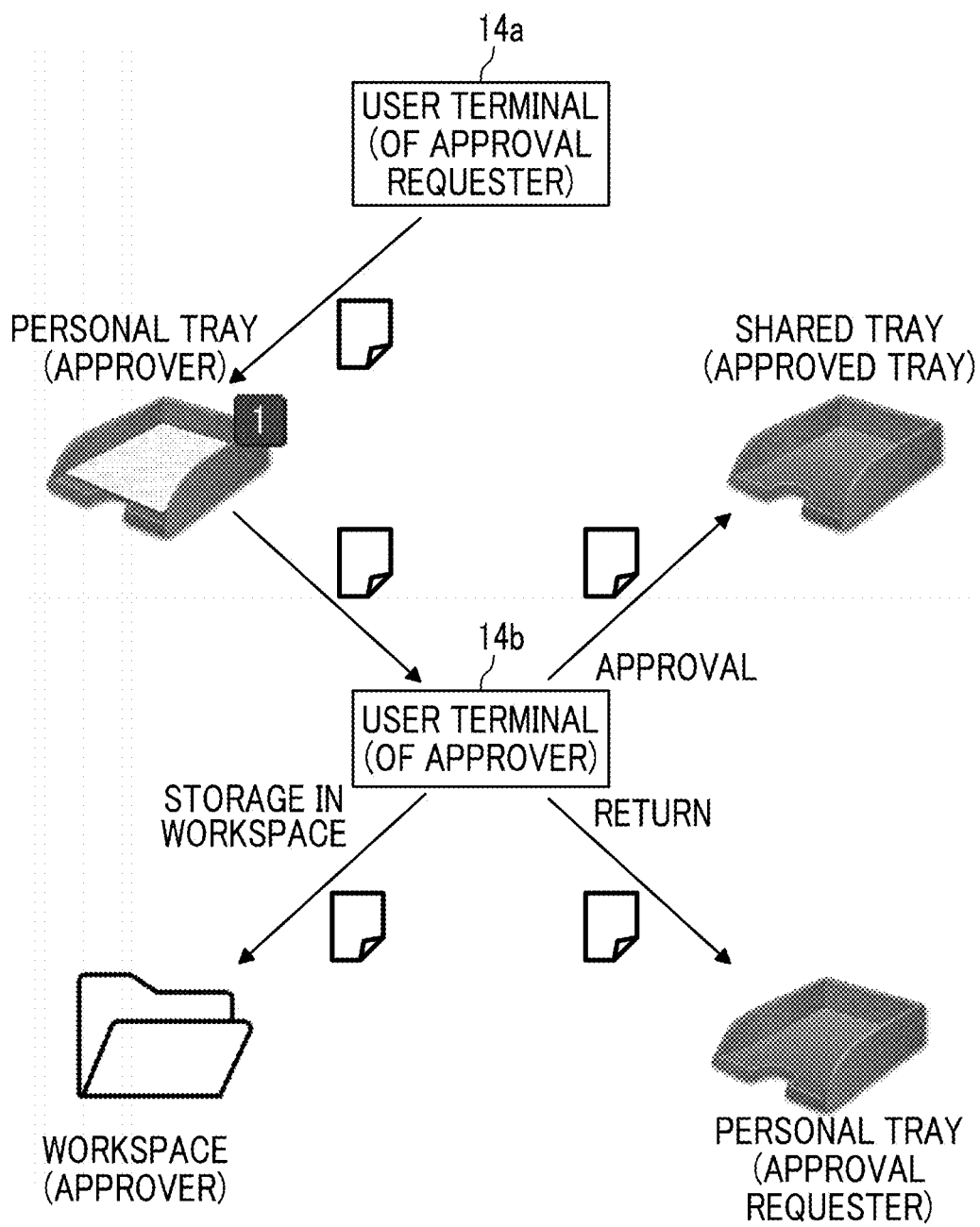
FIG. 3 is a conceptual diagram illustrating an example of a content of a process in the information processing system according to the exemplary embodiment.

FIG. 3 is a conceptual diagram illustrating contents of processes performed by the document management unit 30 and the notification instruction unit 32. The folder defined in the memory 22 will be described before describing a specific example of the processes performed by the document management unit 30 and the notification instruction unit 32.

A plurality of types of folders having different roles and access permissions are defined in a storage region of the memory 22. The electronic document is stored in each folder. In the exemplary embodiment, a personal tray, a workspace, and a shared tray are defined as the types of folders.

The personal tray is a personal folder of the user. The personal tray is provided for each user. The user can store the electronic document in the own personal tray and browse (that is, download to the user terminal 14) the electronic document stored in the own personal tray. In addition, the user can store the electronic document in a personal tray of another person. The user cannot browse the electronic document stored in the personal tray of the other person. For example, in a case where an approval requester wants to obtain approval from an approver for a certain electronic document, the approval requester can store the electronic document in a personal tray of the approver. As will be described in detail later, in a case where the electronic document is stored in the personal tray, the notification instruction unit 32 transmits the notification to the user corresponding to the personal tray.

The workspace is a personal folder of the user and is a work folder. The workspace is provided for each user like the personal tray. However, unlike the personal tray, the user can access the own workspace and cannot access a workspace of another person. That is, while the user can store the electronic document in the own workspace and browse the electronic document stored in the own workspace, the user cannot store the electronic document in the workspace of the other person and cannot browse the electronic document stored in the workspace of the other person. For example, the user can store an electronic document of a work in progress in the workspace.

The personal tray and the workspace are automatically generated in a case where the user registers for the document management service.

The shared tray is a folder that can be shared by a plurality of users. The shared tray can be accessed by the plurality of users. That is, each user can store the electronic document in the shared tray and browse the electronic document stored in the shared tray. Accordingly, the shared tray can also be used for exchanging the electronic document among the plurality of users. The shared tray can be generated by the user. In addition, a plurality of shared trays may be defined. The user can determine an application of each shared tray in advance. In this case, the electronic document corresponding to the application is stored in the shared tray. For example, a shared tray that is set to store an approved electronic document stores the electronic document approved by the approver. The approval requester can browse the approved electronic document stored in the shared tray. In a case where the electronic document is stored in the shared tray, the notification instruction unit 32 transmits the notification to a user who is set in advance for the shared tray. For example, a member of a certain department of a certain company is registered in advance for a shared tray for storing an approved electronic document of the department, and the notification is transmitted to the member of the department in a case where the approver (for example, a head of department) stores the electronic document in the shared tray.

For each folder defined in the memory 22, the folder ID or the uniform resource locator (URL) for uniquely identifying the folder is defined. The folder ID, the information indicating the type of the folder, and the user ID of the user corresponding to the folder are stored in the folder DB 26 in association with each other.

Hereinafter, a summary of an example of the processes performed by the document management unit 30 and the notification instruction unit 32 will be described with reference to FIG. 3 using an example of a case where the electronic document for which the approval requester requests approval is stored in the personal tray of the approver. An approved tray that is the shared tray illustrated in FIG. 3 is set in advance to store the electronic document approved by the approver, and the approval requester is registered in advance as the user of the notification destination.

First, the approval requester accesses the document management server 12 from the user terminal 14a of the approval requester and authenticates with the document management server 12 (that is, the approval requester logs in to the document management service). An authentication method may be a known method such as a password. Then, the approval requester transmits the electronic document for which the approval requester wants approval from the approver, to the document management server 12 from a user terminal 14a. Specifically, the approval requester transmits the electronic document to the document management server 12 by designating the personal tray of the approver. The electronic document has document properties such as the user ID of the user transmitting the electronic document, a document name of the electronic document, an extension (type of document), and a data capacity.

The document management unit 30 stores the received electronic document in the personal tray of the approver as designated by the approval requester. At the same time, the document ID is assigned to the electronic document, and the document ID and the electronic document are managed in association with each other.

In a case where the electronic document is stored in the personal tray of the approver, the notification instruction unit 32 specifies a user ID of the user (that is, the approver) corresponding to the personal tray by referring to the folder DB 26. Furthermore, the notification instruction unit 32 specifies a notification destination of the user (that is, a user terminal 14b of the approver) associated with the specified user ID by referring to the user DB 24. Then, the notification instruction unit 32 transmits notification information to the user terminal 14b of the approver in order to notify the user. Details of the notification information will be described later.

The approver who receives the notification accesses the document management server 12 from the user terminal 14b, authenticates with the document management server 12, and downloads (copies) the electronic document to the user terminal 14b from the own personal tray. The electronic document downloaded to the user terminal 14b from the personal tray is locked (cannot be edited) on the document management server. Such a lock prevents inconsistency in content between the electronic document in the user terminal 14b and the same electronic document on the document management server 12.

In a case where the approver approves the electronic document, an approval stamp is assigned to the electronic document in the user terminal 14b of the approver. The stamp is an object (referred to as an annotation) added to the electronic document. The electronic document to which the approval stamp is assigned, and approval information indicating that approval has been made are transmitted to the document management server 12. At this point, the electronic document is deleted from the user terminal 14b of the approver.

The document management unit 30 determines whether or not the electronic document is approved based on the approval information and stores the electronic document in the approved tray. At this point, the original electronic document stored in the personal tray of the approver is deleted. In a case where the electronic document is stored in the approved tray, the notification instruction unit 32 specifies a notification destination of the approval requester registered as the user of the notification destination of the approved tray based on the user DB 24 and transmits the notification to the user terminal 14a of the approval requester. The approval requester can access the document management server 12 again in response to the notification and check the approved electronic document stored in the approved tray.

In a case where the approved tray is not provided, the approved electronic document is transmitted back to the personal tray of the approval requester. Even in this case, the notification instruction unit 32 transmits the notification to the approval requester, and the approval requester can check the approved electronic document stored in the own personal tray.

In a case where the approver does not approve and returns the electronic document, a return stamp is assigned to the electronic document in the user terminal 14b of the approver. The electronic document to which the return stamp is assigned, and return information indicating that return has been made are transmitted to the document management server 12. At this point, the electronic document is deleted from the user terminal 14b *of the approver.*

The document management unit 30 determines whether or not the electronic document is returned based on the return information and stores the electronic document in the personal tray of the approval requester. At this point, the original electronic document stored in the personal tray of the approver is deleted. In a case where the electronic document is stored in the personal tray of the approval requester, the notification instruction unit 32 specifies the notification destination of the approval requester based on the user DB 24 and transmits the notification to the user terminal 14*a* of the approval requester. The approval requester can access the document management server 12 again in response to the notification and check the returned electronic document stored in the own personal tray.

The approver can temporarily store the electronic document in the own workspace before approving or returning the electronic document. For example, the approver can edit the electronic document in the user terminal 14*b*, then temporarily store the electronic document in the workspace, and approve or return the electronic document later. In a case of storing the electronic document in the workspace, the electronic document is transmitted to the document management server 12. In this case, the approver designates the own workspace as a storage destination of the electronic document and then, transmits the electronic document. At this point, the electronic document is deleted from the user terminal 14*b* of the approver.

The document management unit 30 stores the received electronic document in the workspace of the approver. At this point, the original electronic document stored in the personal tray of the approver is deleted.

FIG. 4 is a schematic configuration diagram of the user terminal 14. While the user terminal 14 is a tablet terminal such as a smartphone in the exemplary embodiment, any computer may be used as the user terminal 14 as long as functions described below are performed. For example, the user terminal 14 may be a personal computer.

A communication interface 40 is configured to include, for example, a network adapter. The communication interface 40 performs a function of communicating with the document management server 12 through the communication line 16.

An input interface 42 is configured to include, for example, a touch panel, a button, a mouse, or a keyboard. The input interface 42 is used for inputting an instruction of the user into the user terminal 14.

A display 44 is configured to include, for example, a liquid crystal panel. Various display screens are displayed on the display 44.

A memory 46 is configured to include, for example, an HDD, an SSD, an eMMC, a ROM, or a RAM. The memory 46 stores an information processing program for functioning of each unit of the user terminal 14. In addition, as illustrated in FIG. 4, a document application 48 for executing a process related to the electronic document is installed in the memory 46.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, the processor 50 performs functions as a display control unit 52 and a document processing unit 54 in accordance with the information processing program stored in the memory 46.

The display control unit 52 executes a process of displaying various display screens on the display 44. Specifically, the display control unit 52 displays a notification message on the display 44 based on the notification information received from the document management server 12. In addition, in a case where the document application 48 is started, the display control unit 52 displays an execution screen of the document application 48 on the display 44. As will be described in detail later, the electronic document and an operator for executing the process related to the electronic document are displayed on the execution screen of the document application 48.

The document processing unit 54 executes the process related to the electronic document. Specifically, in a case where the document application 48 is executed, and an instruction is input from the user in the document application 48, the process related to the electronic document is executed in accordance with the instruction. A process related to an electronic document D is not limited to a process of editing the electronic document D and includes a process for transmitting the electronic document D to the document management server 12 (that is, the document management service).

Hereinafter, details of processes of the display control unit 52 and the document processing unit 54 will be described assuming a case where a user (representatively, the approval requester who requests approval of the electronic document from the approver) belonging to a certain organization stores the electronic document in the personal tray of the approver who is a manager of the organization.

As described with reference to FIG. 3, in a case where the electronic document is stored in the personal tray of the approver, the notification instruction unit 32 of the document management server 12 transmits the notification information to the user terminal 14*b* of the approver. A content of the notification information is illustrated in FIG. 5. The notification information includes the document properties (for example, the user ID and the user name of the user storing the electronic document in the personal tray of the approver and the document name of the electronic document) of the electronic document stored in the personal tray of the approver, the document ID of the electronic document, and a folder ID (or a URL) of the personal tray of the approver.

Furthermore, in the exemplary embodiment, the notification information may include an action ID as process content information. The action ID indicates a content of an expected process that is expected to be subsequently executed on the electronic document. For example, the content of the process indicated by the action ID is, but not limited to, an approval process of approving the electronic document, a return process of returning the electronic document, or a storage process of storing the electronic document in the workspace of the approver. The action ID can be assigned to the electronic document in advance. The action ID may be included in the document properties of the electronic document.

There are various methods for assigning the action ID to the electronic document. For example, the user who stores the electronic document in the personal tray of the approver can assign the action ID to the electronic document. For example, in a case where the user who stores the electronic document in the personal tray of the approver is the approval requester who requests approval of the electronic document from the approver, the process expected for the electronic document is apparently the approval process. Thus, the approval requester can assign the action ID indicating the approval process to the electronic document. Specifically, the approval requester provides an input indicating that the expected process is the approval process to the user terminal 14, and the document processing unit 54 of the user terminal 14 transmits the electronic document to the document management server 12 by associating the electronic document with the action ID indicating the approval process. In addition, in a case where the electronic document is a draft in a certain document format, and the user who stores the electronic document in the personal tray of the approver wants the approver to correct and review the draft, the process expected for the electronic document may be the storage process in the workspace of the approver. Thus, the user can assign the action ID indicating the storage process in the workspace to the electronic document.

In addition, the action ID may be assigned to the electronic document in accordance with the folder storing the electronic document in the document management server 12. In other words, the content of the expected process for the electronic document may be decided in accordance with the folder storing the electronic document. For example, in a case where the personal tray of the approver mostly stores the electronic document for which approval from the approver is requested, the action ID indicating the approval process may be assigned to the electronic document stored in the personal tray of the approver. By doing so, the action ID can be assigned to the electronic document without a need for the user who stores the electronic document in the personal tray of the approver to perform a work of assigning the action ID.

In addition, the action ID may be assigned in accordance with a content of the electronic document that is obtained by performing an analysis process on the electronic document by the document processing unit 54 of the user terminal 14 or the document management unit 30 of the document management server 12. For example, as a result of analyzing, by the document processing unit 54 or the document management unit 30, the electronic document for which an instruction for storing in the personal tray of the approver is issued from the approval requester, in a case where incompleteness such that an item necessary for obtaining approval is not disclosed is detected, the process expected for the electronic document is the return process. Thus, the document processing unit 54 or the document management unit 30 can assign the action ID indicating the return process to the electronic document.

Figure 6:
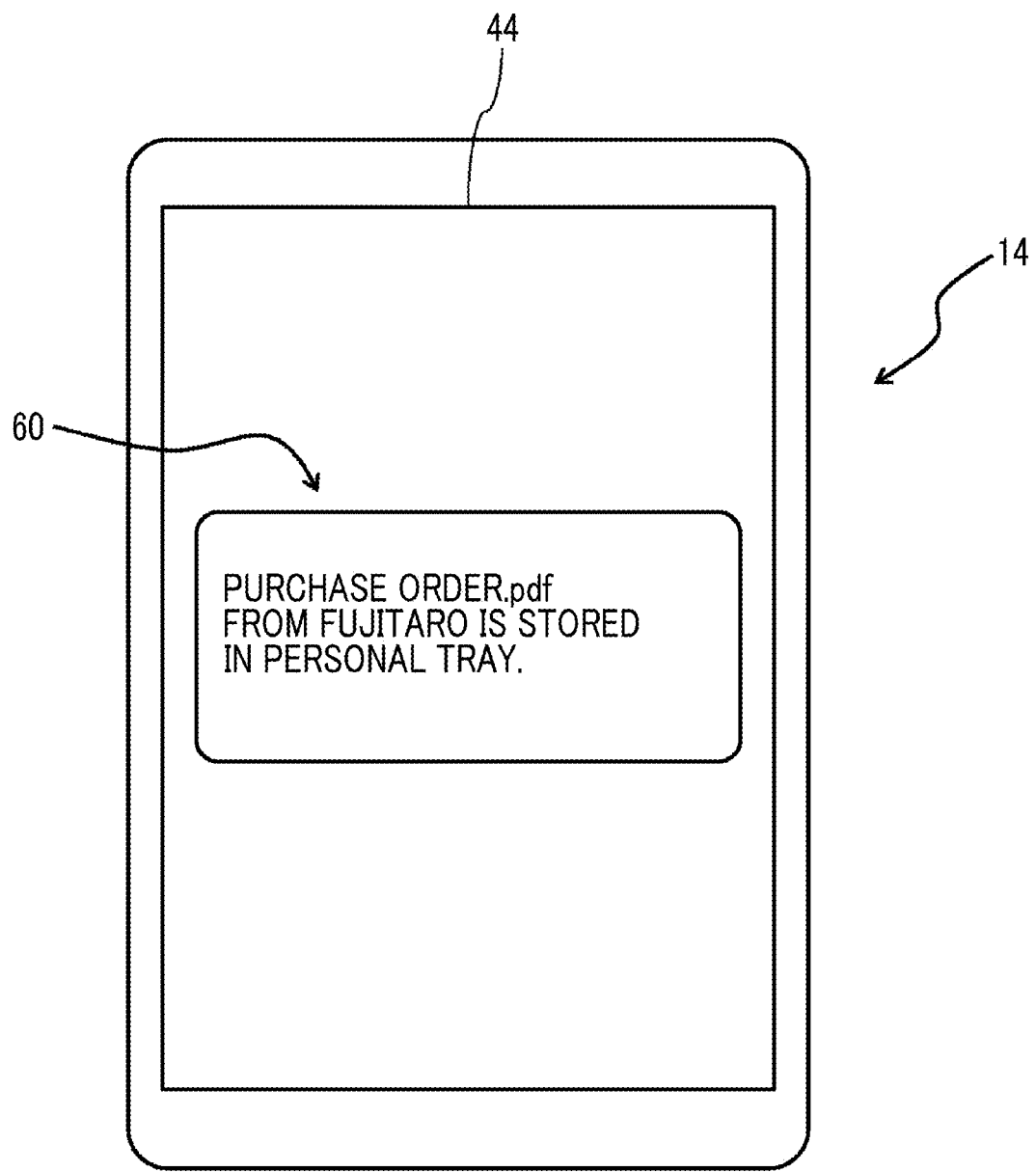
FIG. 6 is a diagram illustrating a notification screen.

In a case where the display control unit 52 of the user terminal 14 of the approver receives the notification information from the document management server 12, the display control unit 52 displays the notification message that prompts the approver to execute the process related to the electronic document stored in the personal tray of the approver, on the display 44 based on the notification information. An example of a notification message 60 is displayed in FIG. 6. As illustrated in FIG. 6, the notification message 60 such as "Purchase order.pdf from Fujitaro is stored in personal tray." is displayed on the display 44 of the user terminal 14 of the approver. Here, Fujitaro is the user name of the user who stores the electronic document in the personal tray of the approver, and purchase order.pdf is the document name of the electronic document. The user name and the document name are information included in the notification information as illustrated in FIG. 5.

The approver accesses the personal tray of the approver of the document management service from the user terminal 14 in response to the notification message and downloads the electronic document to the user terminal 14 of the approver. In order to perform the process related to the electronic document, the approver opens the electronic document by starting the document application 48. Here, in a case where the approver operates the notification message 60, for example, it is preferable that the document processing unit 54 automatically performs a series of processes including access to the personal tray of the approver, download of the electronic document, and opening of the electronic document by starting the document application 48. Accordingly, an effort of opening the electronic document using the document application 48 by the approver is reduced. For example, a case where the approver operates the notification message 60 is a case where the approver taps the notification message 60, or a case where the approver operates the notification message 60 in a sliding manner.

While the action ID is included in the notification information in the exemplary embodiment, the action ID may be transmitted to the user terminal 14 together with the electronic document in a case where the electronic document stored in the personal tray of the approver is downloaded to the user terminal 14 of the approver. That is, the action ID does not need to be included in the notification information and may be transmitted to the user terminal 14 separately from the notification information.

In a case where the document processing unit 54 of the user terminal 14 of the approver starts the document application 48, the display control unit 52 displays the electronic document downloaded from the personal tray of the approver and an operator for executing the process related to the electronic document on the display 44. As will be described later, a type of operator displayed here varies depending on a process content indicated by the action ID. First, a plurality of operators that are displayed on the display 44 normally, that is, in a case where the action ID is not assigned to the electronic document, and the user terminal 14 does not receive the action ID, will be described.

Figure 7:
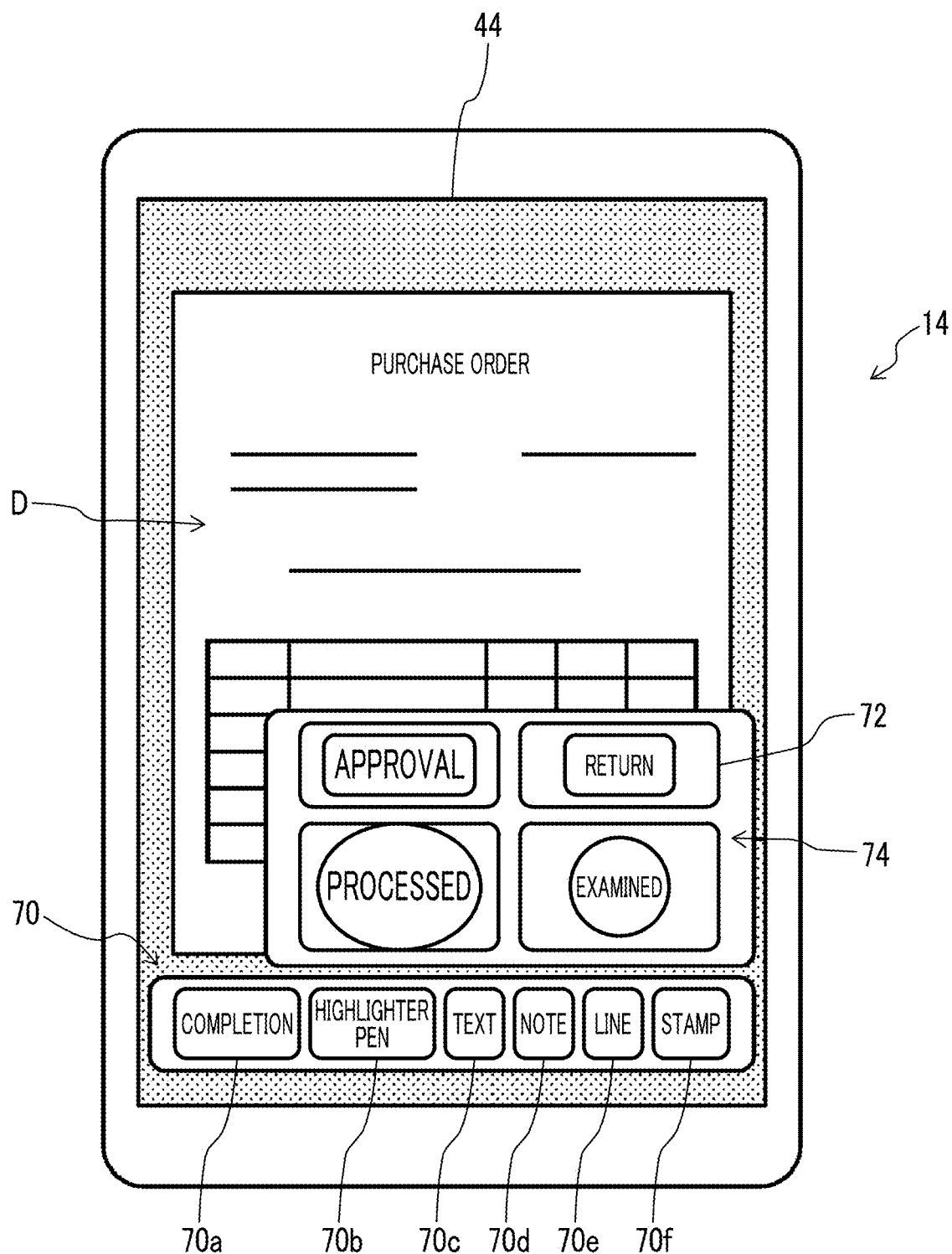
FIG. 7 is a first diagram illustrating operators normally displayed on the user terminal.

FIG. 7 is a first diagram illustrating the operators normally displayed on the display 44. In a case where the document processing unit 54 starts the document application 48, the plurality of operators are displayed on the execution screen of the document application 48 together with the electronic document D downloaded from the personal tray of the approver. In the example in FIG. 7, a toolbar 70 including a plurality of operation buttons is displayed as the plurality of operators. The toolbar includes a completion button 70a corresponding to a process of completing the editing of the electronic document D, a highlighter pen button 70b corresponding to a process of assigning a marker to the electronic document D using a highlighter pen, a text button 70c corresponding to a process of assigning a text to the electronic document D, a note button 70d corresponding to a process of assigning a note to the electronic document D, a line button 70e corresponding to a process of assigning a line to the electronic document D, and a stamp button 70f corresponding to a process of assigning a stamp to the electronic document D. By operating (for example, tapping) an operation button included in the toolbar 70, the approver can provide an input indicating execution of a process corresponding to the operation button to the user terminal 14. An operation button for editing the electronic document D is displayed in the toolbar 70. The process of assigning the stamp to the electronic document D is also a process of editing the electronic document D.

In a case where the approver operates the stamp button 70f, the display control unit 52 displays a stamp toolbar 74 including a plurality of stamp input buttons 72 as the plurality of operators on the display 44. Examples of the stamp include, but not limited to, an approval stamp indicating that the electronic document D is approved, a return stamp indicating the electronic document D is returned, a processed stamp indicating that the electronic document D is processed, and an examined stamp indicating that the electronic document D is examined. By operating a stamp input button 72 included in the stamp toolbar 74, the approver can assign a stamp corresponding to the stamp input button 72 to the electronic document D. An image of each stamp is displayed on the electronic document D in a superimposed manner by assigning each stamp to the electronic document D.

Figure 8:
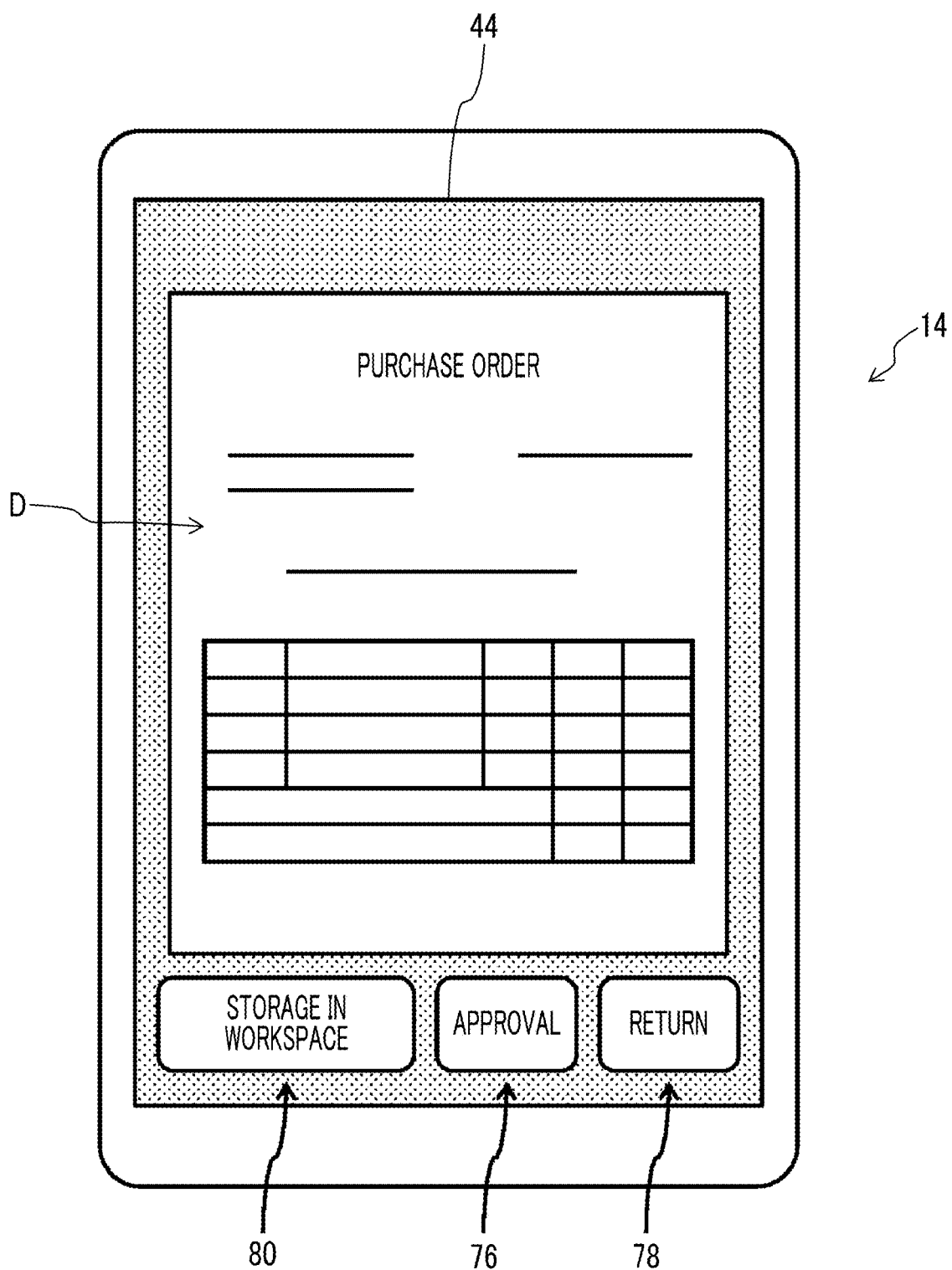
FIG. 8 is a second diagram illustrating the operators normally displayed on the user terminal.

FIG. 8 is a second diagram illustrating the operators normally displayed on the display 44. In a case where the approver operates the completion button 70*a*, the display control unit 52 removes the toolbar 70 and the stamp toolbar 74 and then, displays an approval button 76, a return button 78, and a storage button 80 on the display as the plurality of operators. These buttons are buttons corresponding to processes of storing the electronic document D in predetermined folders of the document management server 12. In a case where the approver operates the approval button 76, the electronic document D is transmitted to the document management server 12 from the user terminal 14, and the electronic document D is stored in the approved tray (refer to FIG. 3). In a case where the approver operates the return button 78, the electronic document D is transmitted to the document management server 12 from the user terminal 14, and the electronic document D is stored in the personal tray of the approval requester (refer to FIG. 3). In a case where the approver operates the storage button 80, the electronic document D is transmitted to the document management server 12 from the user terminal 14, and the electronic document D is stored in the workspace of the approver (refer to FIG. 3).

In such a manner, the plurality of operators corresponding to a plurality of processes related to the electronic document D are normally displayed on the display 44. Accordingly, the approver has to specify an operator necessary for a process related to the electronic document D from the plurality of operators.

In a case where the action ID is assigned to the electronic document stored in the personal tray of the approver, and the user terminal 14 receives the action ID, the display control unit 52 performs highlighted display of an operator for executing the expected process indicated by the action ID on a display screen in the execution screen of the document application 48 based on the action ID, upon performing of the process related to the electronic document by the approver, that is, upon opening of the electronic document by the document application 48 in the exemplary embodiment. Hereinafter, each of cases where the expected process indicated by the action ID is the approval process, the return process, and the storage process in the workspace will be described.

Figure 9:
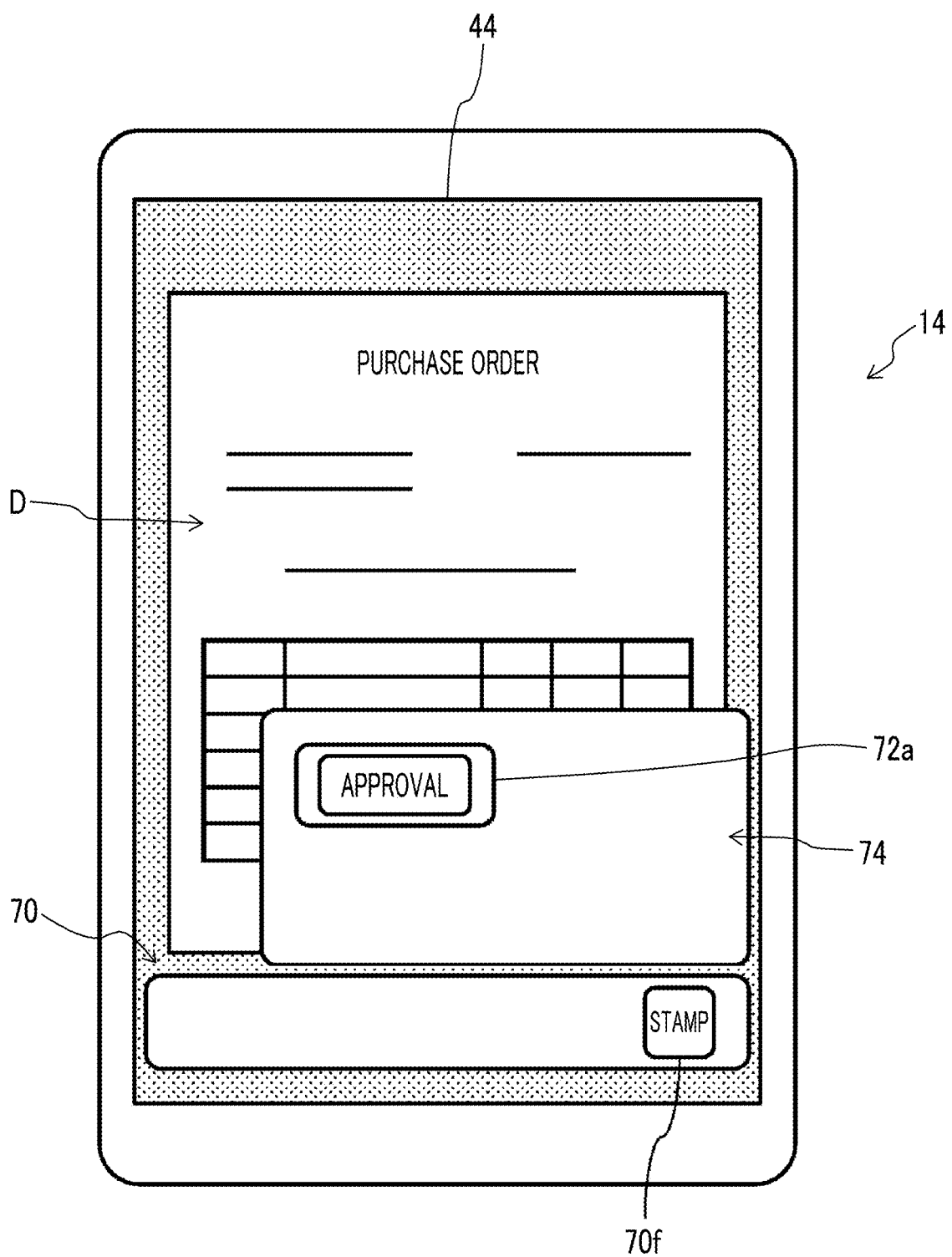
FIG. 9 is a first diagram illustrating operators displayed on the user terminal in a case where an action ID indicates an approval process.

FIG. 9 is a first diagram illustrating operators displayed on the display 44 in a case where the action ID indicates the approval process. In a case where the action ID received by the user terminal 14 indicates the approval process, an operator for executing the approval process on the electronic document D is subjected to the highlighted display together with the electronic document D downloaded from the personal tray of the approver, upon starting of the document application 48 by the document processing unit 54.

In the exemplary embodiment, the approval process for the electronic document D is a process of assigning the approval stamp to the electronic document D and storing the electronic document D in the approved tray. Accordingly, in a case where the electronic document D is opened by starting the document application 48, the display control unit 52 performs the highlighted display of the stamp button 70*f* necessary for assigning the approval stamp to the electronic document D. The highlighted display may have any aspect as long as a display aspect in which the stamp button 70*f* stands out compared to the other operators is used. For example, the stamp button 70*f* which is the operator for executing the expected process can be displayed to be larger than the operators for executing the processes other than the expected process, that is, the operators other than the stamp button 70*f*. In addition, a color of the stamp button 70*f* may be displayed differently from colors of the other operators. In the exemplary embodiment, the display control unit 52 performs the highlighted display of the stamp button 70*f* by displaying the stamp button 70*f* and not displaying the operators other than the stamp button 70*f*.

In a case where the approver operates the stamp button 70*f*, the stamp toolbar 74 is displayed. Here, in a case where the user terminal 14 receives the action ID indicating the approval process, the display control unit 52 also performs the highlighted display of an approval stamp button 72*a* in the stamp toolbar 74. The approval stamp button 72*a* is an operator for assigning an object (in the exemplary embodiment, a stamp) related to the approval process, which is the expected process, to the electronic document D. In the exemplary embodiment, the approval stamp button 72*a* is subjected to the highlighted display by displaying only the approval stamp button 72*a* and not displaying the other stamp buttons for assigning the stamps related to the processes other than the approval process to the electronic document D in the stamp toolbar 74. However, the highlighted display may have various aspects as described above.

Figure 10:
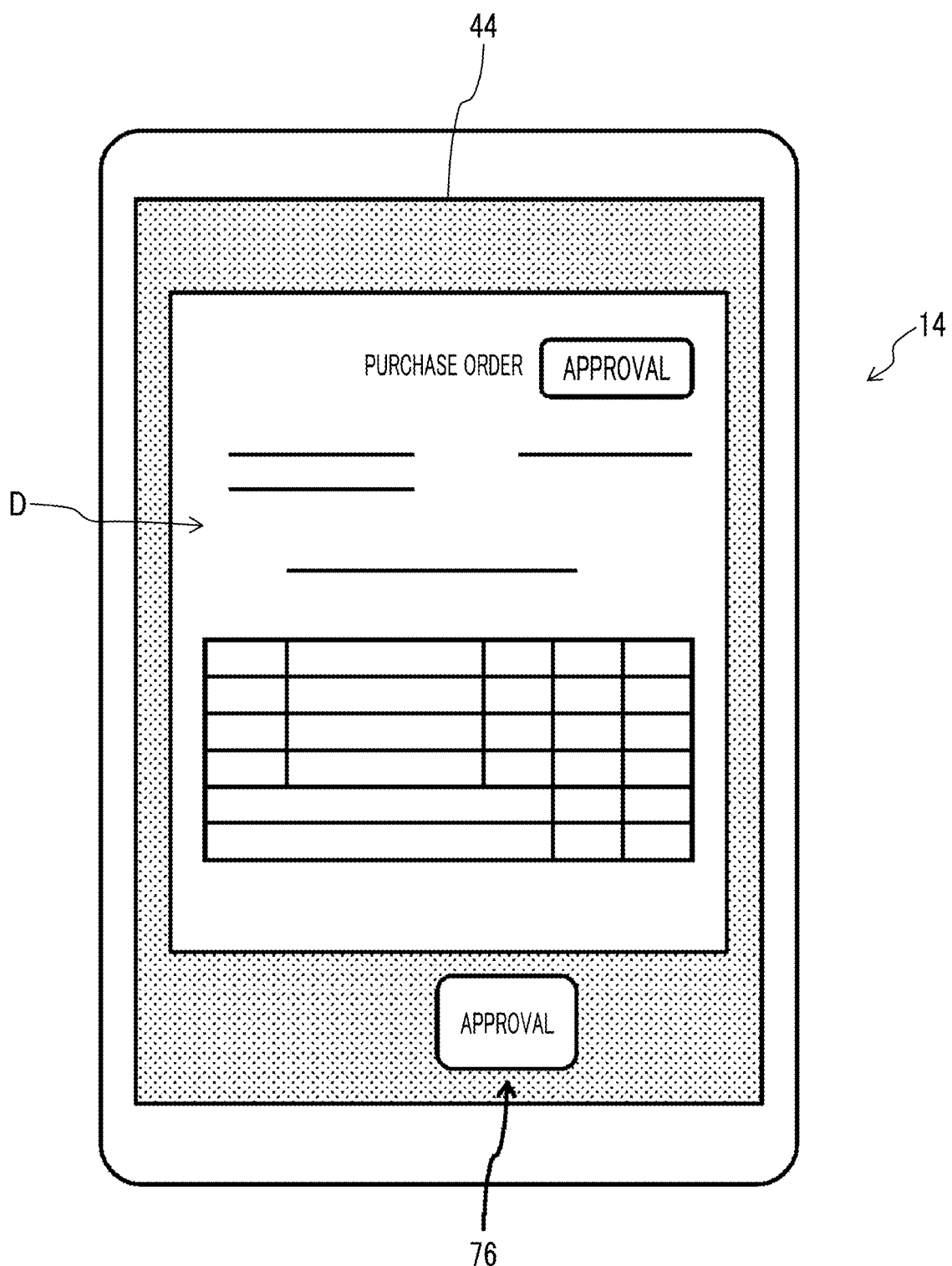
FIG. 10 is a second diagram illustrating the operators displayed on the user terminal in a case where the action ID indicates the approval process.

FIG. 10 is a second diagram illustrating the operators displayed on the display 44 in a case where the action ID indicates the approval process. In a case where the approval stamp is assigned to the electronic document D by operating the approval stamp button 72*a* by the approver, the display control unit 52 removes the toolbar and the stamp toolbar 74 and then, performs the highlighted display of the approval button 76 among the approval button 76, the return button 78, and the storage button 80 (refer to FIG. 8). In the exemplary embodiment, the approval button 76 is subjected to the highlighted display by displaying the approval button 76 and not displaying the return button 78 and the storage button 80. However, the highlighted display may have various aspects as described above.

In such a manner, in a case where the user terminal 14 receives the action ID indicating the approval process, the display control unit 52 sequentially performs the highlighted display of operators necessary for the approval process. Accordingly, the approver may easily specify operators corresponding to the approval process compared to a case of displaying the plurality of operators in the same aspect. Specifically, the approver can execute the approval process of approving the electronic document D by simply operating the operators subjected to the highlighted display one by one.

In the exemplary embodiment, in a case where the electronic document D is opened by starting the document application 48, the display control unit 52 performs the highlighted display of the stamp button 70*f*. However, in a case where the electronic document D is opened by starting the document application 48, the display control unit 52 may perform the highlighted display of the approval stamp button 72*a* in the stamp toolbar 74 by displaying the stamp toolbar 74 from the beginning without displaying the toolbar 70. Accordingly, the approver does not need to operate the stamp button 70f in order to display the approval stamp button 72a, and an operation amount of the approver is reduced.

In addition, similarly, in a case where the notification message 60 (refer to FIG. 6) displayed on the display 44 of the user terminal 14 is operated, and the electronic document is opened by starting the document application 48, the operators for executing the approval process on the electronic document D is subjected to the highlighted display. Accordingly, by operating the notification message 60 and operating the operators subjected to the highlighted display one by one, the approver can execute a series of processes including starting of the document application 48, assigning of the approval stamp to the electronic document, and storage of the electronic document in the approved tray.

Figure 11:
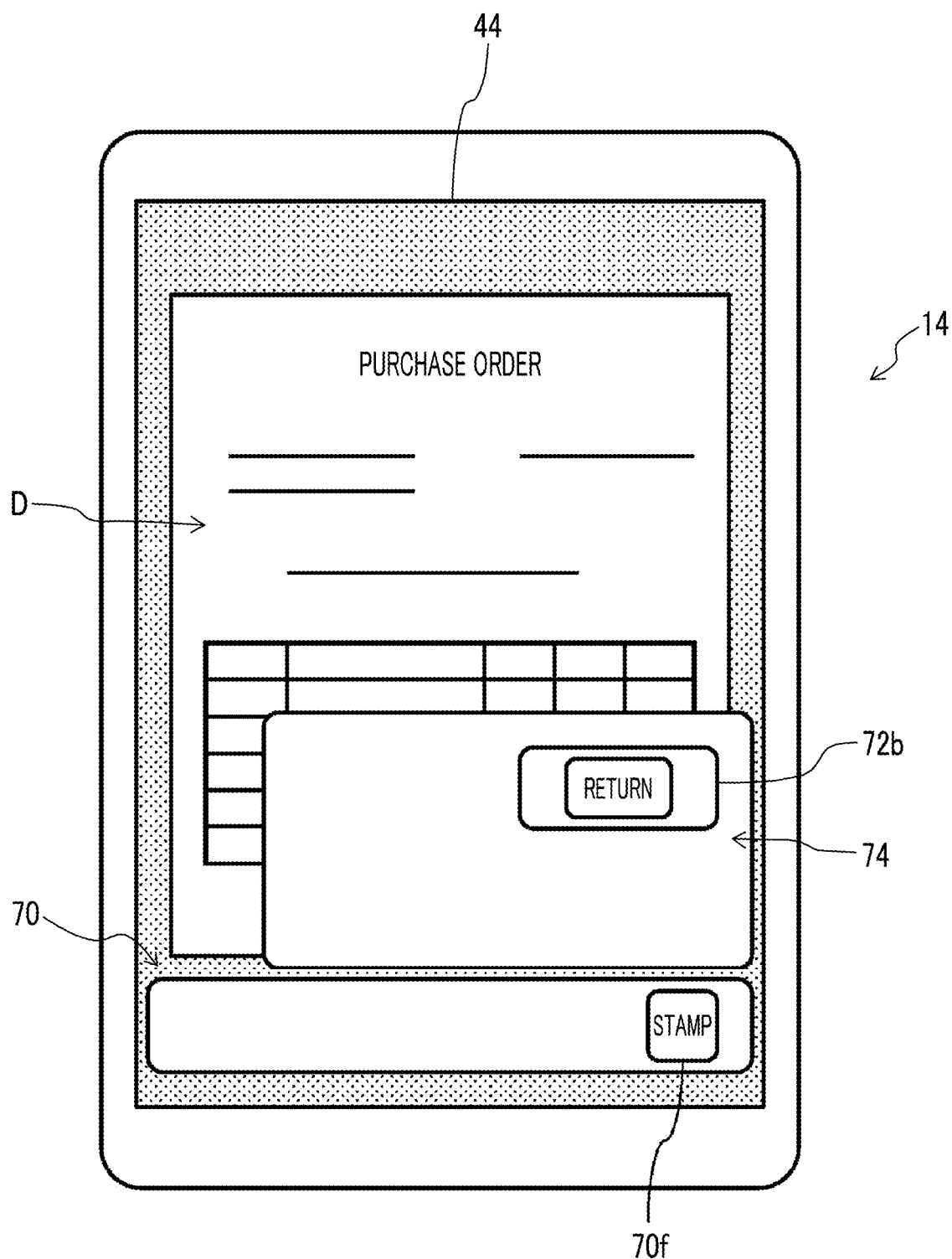
FIG. 11 is a first diagram illustrating operators displayed on the user terminal in a case where the action ID indicates a return process.

FIG. 11 is a first diagram illustrating operators displayed on the display 44 in a case where the action ID indicates the return process. In a case where the action ID received by the user terminal 14 indicates the return process, an operator for executing the return process on the electronic document D is subjected to the highlighted display together with the electronic document D downloaded from the personal tray of the approver, upon starting of the document application 48 by the document processing unit 54.

In the exemplary embodiment, the return process for the electronic document D is a process of assigning the return stamp to the electronic document D and storing the electronic document D in the personal tray of the approval requester. Accordingly, in a case where the electronic document D is opened by starting the document application 48, the display control unit 52 performs the highlighted display of the stamp button 70f necessary for assigning the return stamp to the electronic document D. In the exemplary embodiment, the display control unit 52 performs the highlighted display of the stamp button 70f by displaying the stamp button 70f and not displaying the operators other than the stamp button 70f.

In a case where the approver operates the stamp button 70f, the stamp toolbar 74 is displayed. Here, in a case where the user terminal 14 receives the action ID indicating the return process, the display control unit 52 also performs the highlighted display of a return stamp button 72b in the stamp toolbar 74. The return stamp button 72b is used for assigning a stamp related to the return process, which is the expected process, to the electronic document D. In the exemplary embodiment, the return stamp button 72b is subjected to the highlighted display by displaying only the return stamp button 72b and not displaying the other stamp buttons in the stamp toolbar 74. However, the highlighted display may have various aspects as described above.

Figure 12:
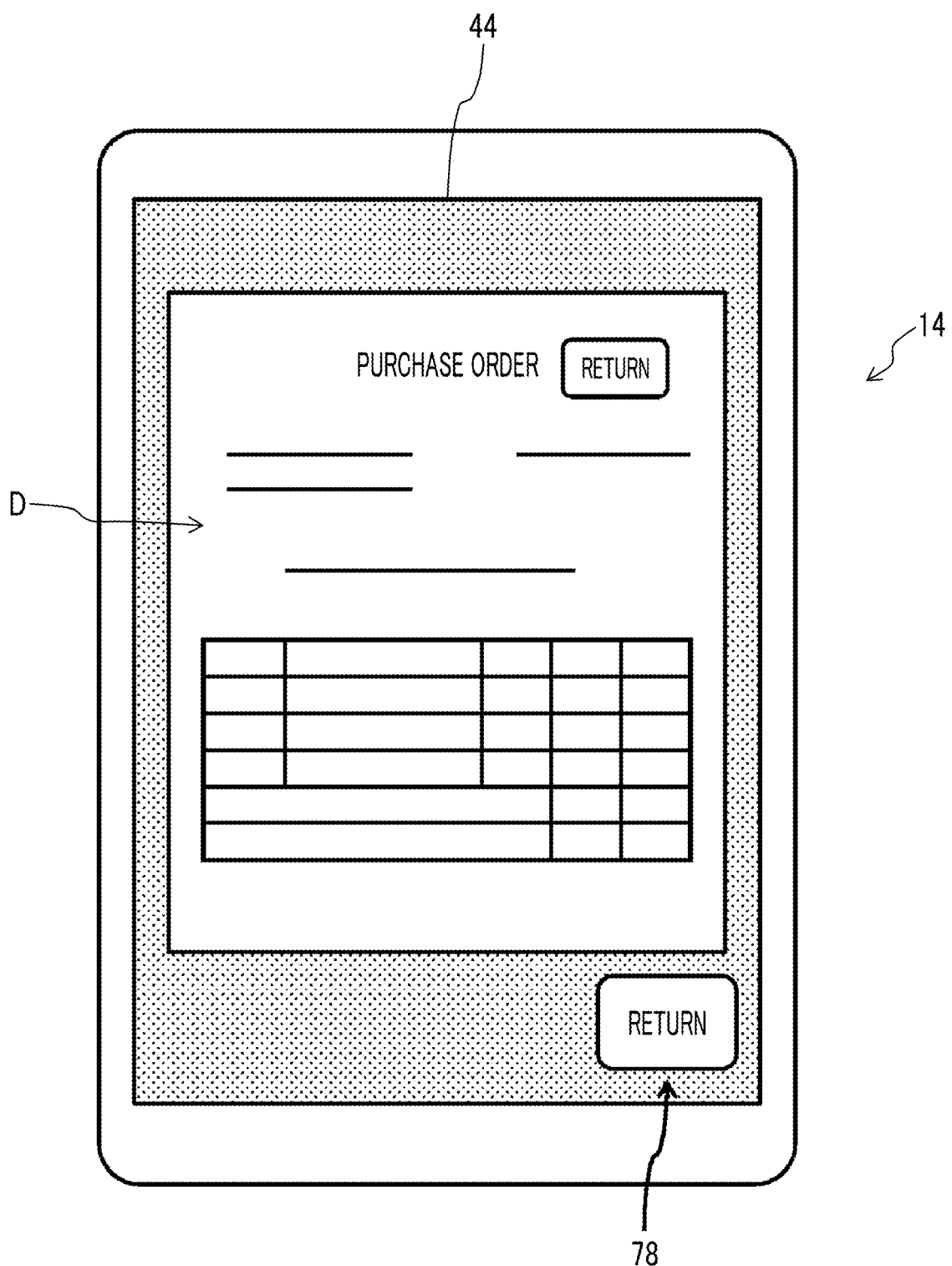
FIG. 12 is a second diagram illustrating the operators displayed on the user terminal in a case where the action ID indicates the return process.

FIG. 12 is a second diagram illustrating the operators displayed on the display 44 in a case where the action ID indicates the return process. In a case where the return stamp is assigned to the electronic document D by operating the return stamp button 72b by the approver, the display control unit 52 removes the toolbar 70 and the stamp toolbar 74 and then, performs the highlighted display of the return button 78 among the approval button 76, the return button 78, and the storage button 80 (refer to FIG. 8). In the exemplary embodiment, the return button 78 is subjected to the highlighted display by displaying the return button 78 and not displaying the approval button 76 and the storage button 80. However, the highlighted display may have various aspects as described above.

In such a manner, in a case where the user terminal 14 receives the action ID indicating the return process, the display control unit 52 sequentially performs the highlighted display of operators necessary for the return process. Accordingly, the approver may easily specify operators corresponding to the return process compared to a case of displaying the plurality of operators in the same aspect. Specifically, the approver can execute the return process of returning the electronic document D by simply operating the operators subjected to the highlighted display one by one.

In the exemplary embodiment, in a case where the electronic document D is opened by starting the document application 48, the display control unit 52 performs the highlighted display of the stamp button 70f. However, in a case where the electronic document D is opened by starting the document application 48, the display control unit 52 may perform the highlighted display of the return stamp button 72b in the stamp toolbar 74 by displaying the stamp toolbar 74 from the beginning without displaying the toolbar 70. Accordingly, the approver does not need to operate the stamp button 70f in order to display the return stamp button 72b, and the operation amount of the approver is reduced.

In addition, similarly, in a case where the notification message 60 (refer to FIG. 6) displayed on the display 44 of the user terminal 14 is operated, and the electronic document is opened by starting the document application 48, the operators for executing the return process on the electronic document D are subjected to the highlighted display. Accordingly, by operating the notification message 60 and operating the operators subjected to the highlighted display one by one, the approver can execute a series of processes including starting of the document application 48, assigning of the return stamp to the electronic document, and storage of the electronic document in the personal tray of the approval requester.

Figure 13:
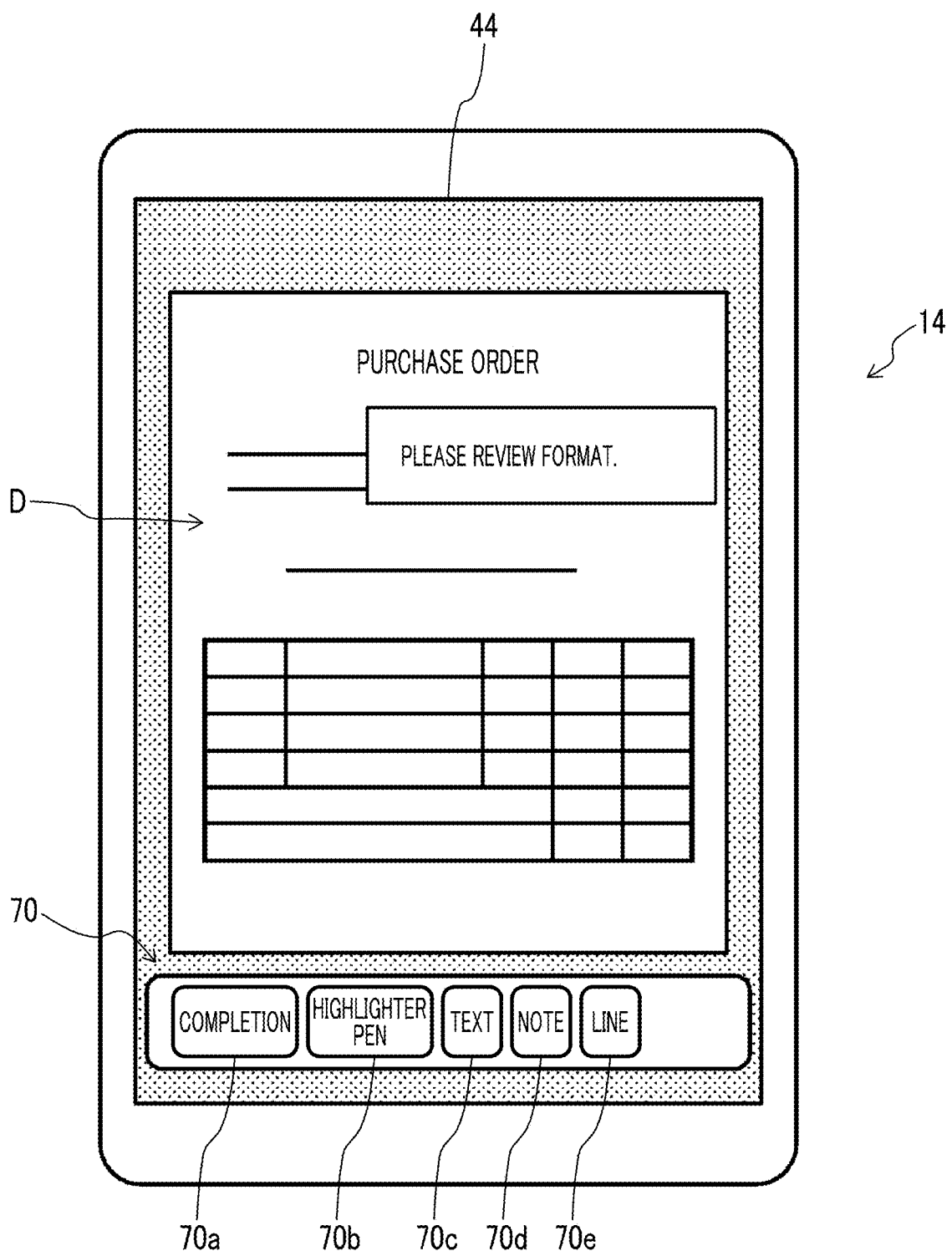
FIG. 13 is a first diagram illustrating operators displayed on the user terminal in a case where the action ID indicates a storage process.

FIG. 13 is a first diagram illustrating operators displayed on the display 44 in a case where the action ID indicates the storage process in the workspace. In a case where the action ID received by the user terminal 14 indicates the storage process in the workspace, an operator for executing the storage process of the electronic document D in the workspace is subjected to the highlighted display together with the electronic document D downloaded from the personal tray of the approver, upon starting of the document application 48 by the document processing unit 54.

In the exemplary embodiment, the storage process of the electronic document D in the workspace is a process of storing the electronic document D in the workspace of the approver after editing such as assigning of a stamp is performed on the electronic document D. Accordingly, in a case where the electronic document D is opened by starting the document application 48, the display control unit 52 performs the highlighted display of the completion button 70a, the highlighter pen button 70b, the text button 70c, the note button 70d, and the line button 70e that are necessary for editing processes other than assigning of the stamp for the electronic document D. In the exemplary embodiment, the display control unit 52 performs the highlighted display of these operation buttons by displaying the completion button 70a, the highlighter pen button 70b, the text button 70c, the note button 70d, and the line button 70e and not displaying the other operators.

The approver can execute the editing processes on the electronic document D by operating the highlighter pen button 70b, the text button 70c, the note button 70d, and the line button 70e.

Figure 14:
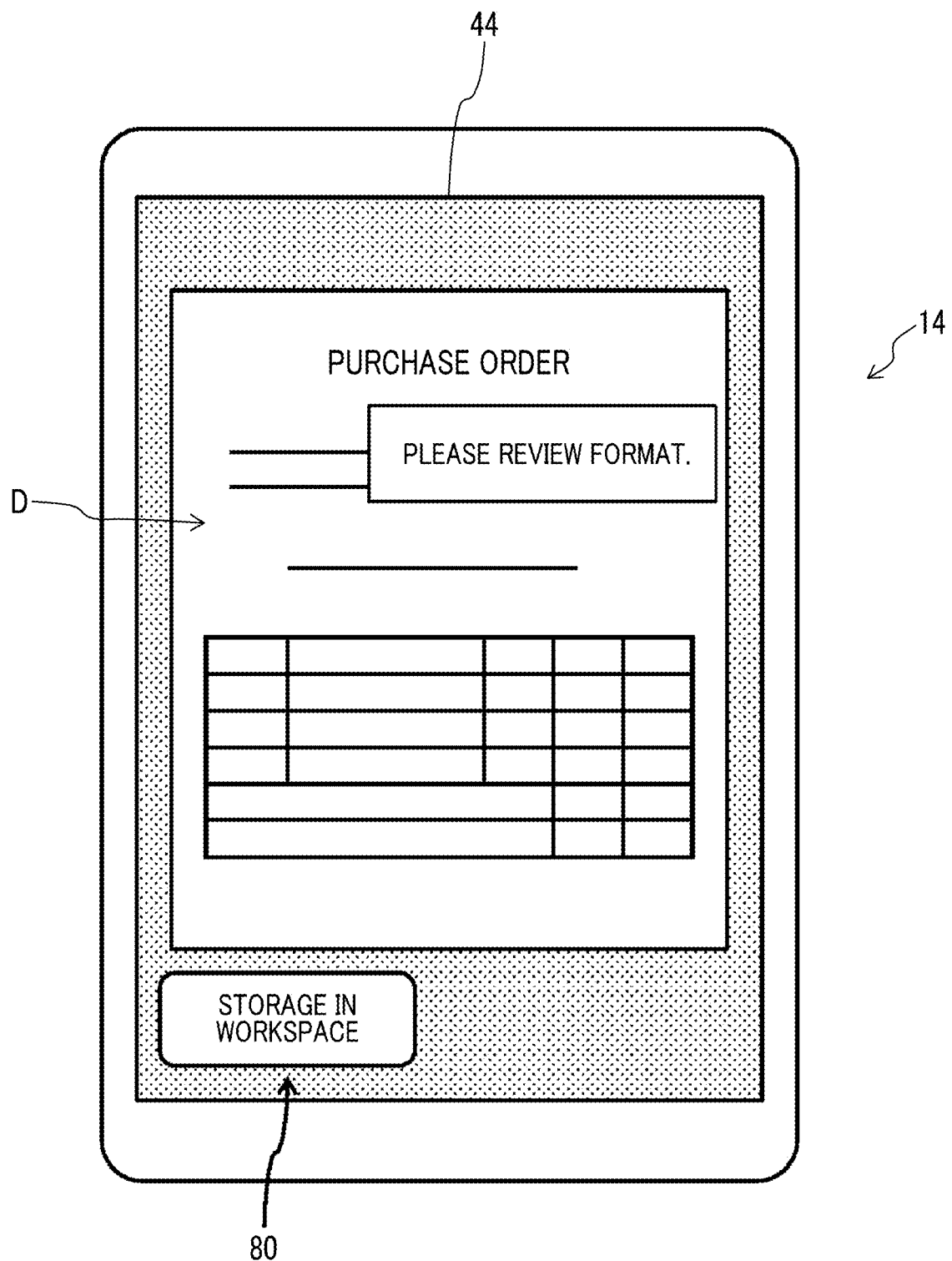
FIG. 14 is a second diagram illustrating the operators displayed on the user terminal in a case where the action ID indicates the storage process.

FIG. 14 is a second diagram illustrating the operators displayed on the display 44 in a case where the action ID indicates the storage process in the workspace. In a case where the approver operates the completion button 70a, the display control unit 52 removes the toolbar 70 and then, performs the highlighted display of the storage button 80 among the approval button 76, the return button 78, and the storage button 80 (refer to FIG. 8). In the exemplary embodiment, the storage button 80 is subjected to the highlighted display by displaying the storage button 80 and not displaying the approval button and the return button 78. However, the highlighted display may have various aspects as described above.

In such a manner, in a case where the user terminal 14 receives the action ID indicating the storage process in the workspace, the display control unit 52 sequentially performs the highlighted display of operators necessary for the storage process. Accordingly, the approver may easily specify operators corresponding to the storage process compared to a case of displaying the plurality of operators in the same aspect. Specifically, the approver can execute the storage process of storing the electronic document D in the workspace of the approver after editing the electronic document D by simply operating the operators subjected to the highlighted display one by one.

Similarly, in a case where the notification message (refer to FIG. 6) displayed on the display 44 of the user terminal 14 is operated, and the electronic document is opened by starting the document application 48, the operators for executing the storage process of storing the electronic document D in the workspace are subjected to the highlighted display. Accordingly, by operating the notification message 60 and operating the operators subjected to the highlighted display one by one, the approver can execute a series of processes including starting of the document application 48, editing of the electronic document, and storage of the electronic document in the workspace of the approver.

Figure 15:
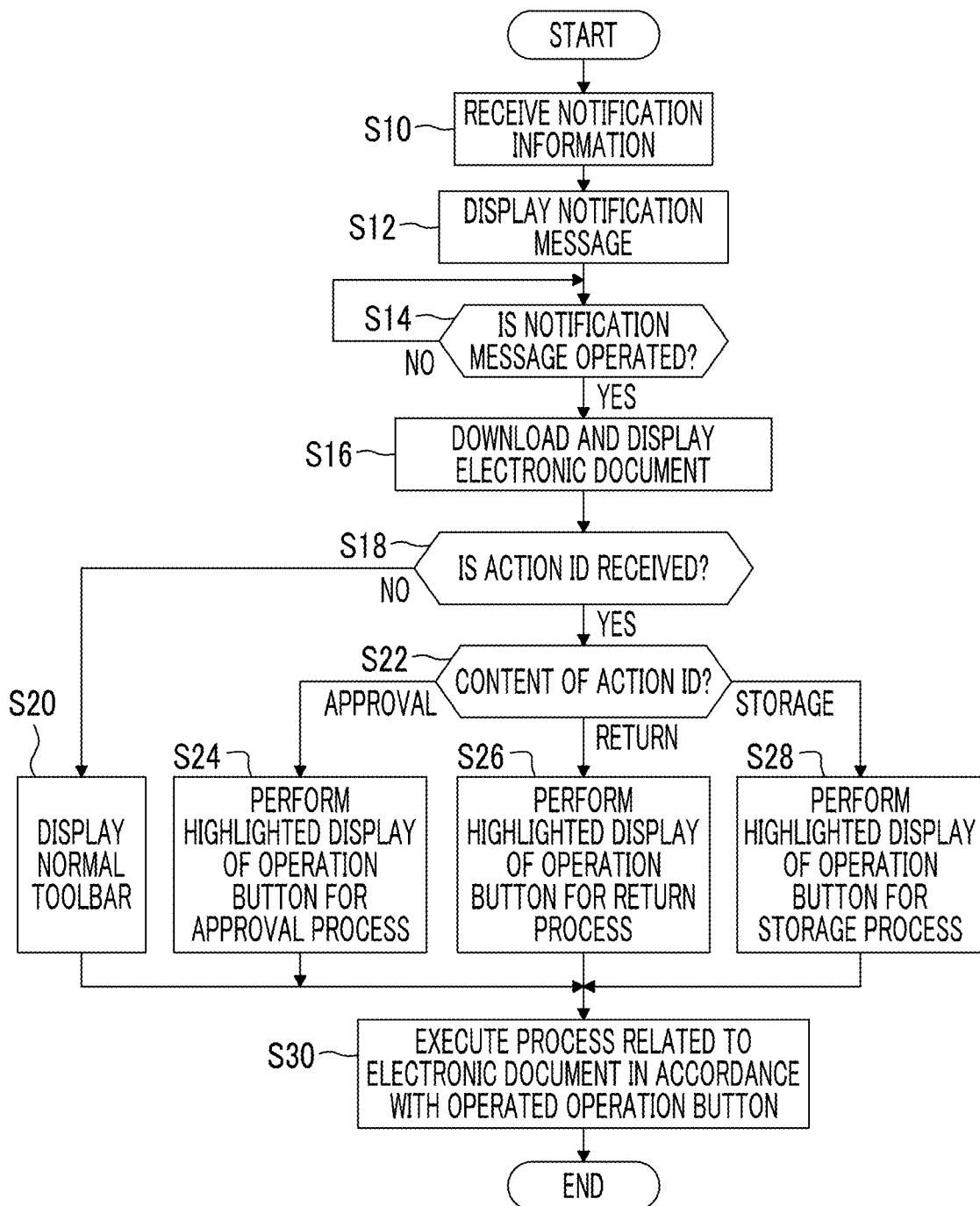
FIG. 15 is a flowchart illustrating a flow of process of the user terminal according to the exemplary embodiment.

Hereinafter, a flow of process of the user terminal will be described in accordance with a flowchart illustrated in FIG. 15. At a start of the flowchart in FIG. 15, the electronic document from the approval requester is stored in the personal tray of the approver.

In step S10, the user terminal 14 of the approver receives, from the document management server 12, the notification information for prompting the approver to execute the process related to the electronic document stored in the personal tray of the approver.

In step S12, the display control unit 52 displays the notification message 60 (refer to FIG. 6) based on the notification information received in step S10 on the display 44.

In step S14, the document processing unit 54 determines whether or not the notification message 60 displayed in step S12 is operated by the user (approver). The document processing unit 54 waits until the notification message 60 is operated by the approver. In a case where the notification message 60 is operated, a transition is made to step S16.

In step S16, the document processing unit 54 accesses the personal tray of the approver of the document management server 12 and downloads the electronic document related to the notification information received in step S10 from the personal tray of the approver. Then, the document processing unit 54 starts the document application 48 and displays the electronic document.

In step S18, the display control unit 52 determines whether or not the user terminal 14 receives the action ID from the document management server 12. Specifically, the display control unit 52 determines whether or not the action ID is included in the notification information received in step S10 or whether or not the action ID is received together with the electronic document in step S16.

In a case where the user terminal 14 does not receive the action ID, a transition is made to step S20. In step S20, the display control unit 52 displays the normally used operators on the execution screen of the document application 48. That is, the display control unit 52 displays the toolbar 70 (refer to FIG. 7) including the completion button 70a, the highlighter pen button 70b, the text button 70c, the note button 70d, the line button 70e, and the stamp button 70f.

In a case where the user terminal 14 receives the action ID, a transition is made to step S22. In step S22, the display control unit 52 determines the process content indicated by the action ID.

In a case where the action ID indicates the approval process, a transition is made to step S24. In step S24, the display control unit 52 performs the highlighted display of operation buttons necessary for the approval process on the execution screen of the document application 48 (refer to FIG. 9 and FIG. 10).

In a case where the action ID indicates the return process, a transition is made to step S26. In step S26, the display control unit 52 performs the highlighted display of operation buttons necessary for the return process on the execution screen of the document application 48 (refer to FIG. 11 and FIG. 12).

In a case where the action ID indicates the storage process in the workspace, a transition is made to step S28. In step S28, the display control unit 52 performs the highlighted display of operation buttons necessary for the storage process in the workspace on the execution screen of the document application 48 (refer to FIG. 13 and FIG. 14).

In step S30, the document processing unit 54 executes the process related to the electronic document in accordance with the operation button operated by the approver.

While the exemplary embodiment according to the invention is described above, the invention is not limited to the exemplary embodiment and can be subjected to various modifications without departing from a gist of the invention.

For example, while a case where the electronic document is stored in the personal tray of the approver in the document management service is generally described in the exemplary embodiment, the invention can be applied to a case where the electronic document is stored in other folders. For example, the invention can be applied to a case where a format of a certain electronic document is reviewed by a plurality of users, and a draft of the format is stored in a certain shared tray. In a case where the electronic document is stored in the shared tray, the notification information including the action ID indicating the editing processes other than assigning of the stamp is transmitted to the user terminal 14 used by the user (user reviewing the format) registered in advance for the shared tray. In a case where each user operates the notification message based on the notification information, operation buttons necessary for the editing processes other than assigning of the stamp are subjected to the highlighted display together with the draft of the format on the execution screen of the document application displayed on the user terminal 14 of each user. Accordingly, each user can easily perform the editing processes on the draft of the format.

In addition, while the process related to the electronic document managed by the document management server 12 is performed in the exemplary embodiment, the electronic document may not be the electronic document managed by the document management server 12, as long as the user terminal 14 can acquire the action ID corresponding to the electronic document. For example, in a case where the document processing unit 54 opens the electronic document stored in the memory 46 of the user terminal 14 by starting the document application 48, that is, even in a case where the user terminal 14 executes the process related to the electronic document in a stand-alone manner, the display control unit 52 can perform the highlighted display of the operator for executing the expected process indicated by the action ID on the display screen as long as the user terminal 14 can acquire the action ID corresponding to the electronic document such that the action ID is assigned to the electronic document in advance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
   receive an electronic document, notification information for prompting a user to execute a process related to the electronic document, and a process content information from a server;
   start a document application and display the electronic document;
   in a case where the user operates a notification message displayed on a display screen based on the notification information, perform highlighted display of an operation button for executing an expected process on the display screen based on the process content information indicating a content of the expected process expected to be executed on the electronic document, wherein the content of the expected process is decided in accordance with a folder that stores the electronic document in the server; and
   execute the process related to the electronic document in accordance with the operation button operated by the user.

2. The information processing apparatus according to claim 1, wherein the processor is configured to:
   as the highlighted display, display the operation button for executing the expected process to be larger than an operation button for executing a process other than the expected process.

3. The information processing apparatus according to claim 1, wherein the processor is configured to:
   as the highlighted display, display the operation button for executing the expected process and not display an operation button for executing a process other than the expected process.

4. The information processing apparatus according to claim 1,
   wherein the expected process is a process of editing the electronic document.

5. The information processing apparatus according to claim 4,
   wherein the expected process includes a process of assigning a specific object to the electronic document, and
   the processor is configured to:
   in a case where the user performs the process related to the electronic document, perform highlighted display of an operation button for assigning an object related to the expected process to the electronic document.

6. A non-transitory computer readable medium storing an information processing program causing a computer to:
   receive an electronic document, notification information for prompting a user to execute a process related to the electronic document, and a process content information from a server;
   start a document application and display the electronic document;
   in a case where the user operates a notification message displayed on a display screen based on the notification information, perform highlighted display of an operation button for executing an expected process on the display screen based on the process content information indicating a content of the expected process expected to be executed on the electronic document, wherein the content of the expected process is decided in accordance with a folder that stores the electronic document in the server; and
   execute the process related to the electronic document in accordance with the operation button operated by the user.

7. An information processing apparatus comprising:
   means for receiving an electronic document, notification information for prompting a user to execute a process related to the electronic document, and a process content information from a server;
   means for starting a document application and display the electronic document;
   means for, in a case where the user operates a notification message displayed on a display screen based on the notification information, performing highlighted display of an operation button for executing an expected process on the display screen based on the process content information indicating a content of the expected process expected to be executed on the electronic document, wherein the content of the expected process is decided in accordance with a folder that stores the electronic document in the server; and
   means for executing the process related to the electronic document in accordance with the operation button operated by the user.

* * * * *